US012724694B2

(12) United States Patent
Huth et al.

(10) Patent No.: US 12,724,694 B2
(45) Date of Patent: Sep. 1, 2026

(54) METHOD FOR TESTING A COMPUTER PROGRAM

(71) Applicant: Robert Bosch GmbH, Stuttgart (DE)

(72) Inventors: Christopher Huth, Heilbronn (DE); Max Camillo Eisele, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 18/664,522

(22) Filed: May 15, 2024

(65) Prior Publication Data

US 2024/0403191 A1 Dec. 5, 2024

(30) Foreign Application Priority Data

May 31, 2023 (DE) .................... 10 2023 205 072.2

(51) Int. Cl.
*G06F 11/362* (2025.01)

(52) U.S. Cl.
CPC .................................. *G06F 11/362* (2013.01)

(58) Field of Classification Search
None
See application file for complete search history.

(56) References Cited

U.S. PATENT DOCUMENTS 6,256,777 B1 * 7/2001 Ackerman .......... G06F 11/3628 717/129
2002/0100018 A1 * 7/2002 Click, Jr. ............ G06F 11/3636 717/124
2002/0100024 A1 * 7/2002 Hunter .................. G06F 11/364 717/129
2006/0037004 A1 * 2/2006 Long .................. G06F 9/45504 717/148
2006/0294432 A1 * 12/2006 Thelen .................. G06F 11/362 714/E11.21
2006/0294433 A1 * 12/2006 Thelen .................. G06F 11/362 714/E11.214
2007/0079292 A1 * 4/2007 Chen ..................... G06F 11/362 717/127
2010/0100715 A1 * 4/2010 Gooding ............. G06F 11/3648 711/125
2012/0151267 A1 * 6/2012 Bhattacharjee ..... G06F 11/3624 714/E11.208
2017/0228304 A1 * 8/2017 Martinez ............. G06F 9/30145
2018/0181480 A1 * 6/2018 Dracea ................ G06F 11/3624

* cited by examiner

*Primary Examiner* — Qing Chen

(74) *Attorney, Agent, or Firm* — Norton Rose Fulbright US LLP

(57) ABSTRACT

A method for testing a computer program. The method includes executing the computer program until a memory enable command is called for a memory region previously allocated by a memory allocation command of the computer program; skipping the memory enable command, and setting, for each of one or more memory locations of the memory region that is to be enabled by the memory enable command, a relevant watchpoint to the memory location of the memory region; and displaying, for each set watchpoint, that the computer program has a bug if the set watchpoint is triggered.

6 Claims, 2 Drawing Sheets

METHOD FOR TESTING A COMPUTER PROGRAM

CROSS REFERENCE

The present application claims the benefit under 35 U.S.C. § 119 of German Patent Application No. DE 10 2023 205 072.2 filed on May 31, 2023, which is expressly incorporated herein by reference in its entirety.

FIELD

The present invention relates to a method for testing a computer program.

BACKGROUND INFORMATION

An essential part in the development of software applications is testing and, if bugs are found, a corresponding debugging. In particular, bugs that result in the failure of an application should be identified and corrected. An important aspect here is testing with regard to important memory regions not being accessed unintentionally (or by an attacker), i.e., testing with memory monitoring, as is done by a so-called (memory) sanitizer. The compilation and testing of software on established desktop and server hardware, e.g., x86, with the aid of various sanitizers is a measure by which bugs, such as, for example, the heartbleed bug that previously went undetected for a long time, can be discovered.

Comprehensive testing, which also includes such memory monitoring, is important, particularly for computer programs in embedded systems, such as control devices for a vehicle, which are often safety-relevant. However, sanitizers that are used for desktop and server hardware are not usable or only poorly usable for such systems because embedded systems typically have limited resources and such sanitizers need considerable resources and thus cannot be used or can even influence the execution of the computer program in such a way that no bug arises in the first place or a bug remains undiscovered.

Methods for testing computer programs that make possible memory monitoring and are suitable for embedded systems are therefore desirable.

SUMMARY

According to various embodiments of the present invention, a method for testing a computer program is described, comprising executing the computer program until a memory enable command is called for a memory region previously allocated by a memory allocation command of the computer program, skipping the memory enable command and setting, for each of one or more memory locations of the memory region that is to be enabled by the memory enable command, a relevant watchpoint to the memory location of the memory region, and displaying, for each set watchpoint, that the computer program has a bug if the set watchpoint is triggered.

This can be done for each or at least several memory enable commands that occur in the computer program (e.g., depending on how many watchpoints are available). The watchpoints can be read watchpoints, write watchpoints, or watchpoints that are triggered both when reading and writing.

The method according to the present invention described above makes testing with memory monitoring possible (i.e., with a sanitizer) with regard to accesses to enabled memory regions on an embedded system with the aid of a debugger. This is particularly suitable when testing with fuzzing, since fuzzing can also be implemented in a debugger-controlled manner and can thus be used effectively for embedded systems.

Sanitizers can be implemented by means of code instrumentation. For this purpose, however, either the source code must be available or an instruction-set-specific instrumentation based on the binary file (binary instrumentation) is required, which is very vulnerable. An alternative instrumentation based on an emulator is also very platform-specific, and each embedded platform needs its own emulator. The method described above makes testing possible using a debugger-controlled sanitizer and requires no instrumentation or emulation and can therefore be applied in many cases.

Various exemplary embodiments of the present invention are specified below.

Exemplary embodiment 1 is a method for testing a computer program product as described above.

Exemplary embodiment 2 is the method according to exemplary embodiment 1, wherein the computer program is executed until the memory allocation command is called, information about which memory region is allocated by the memory allocation command is stored, and the one or more memory locations to which watchpoints are set are ascertained on the basis of the stored information.

In other words, a memory allocation command can stop execution (by setting breakpoints), and information about the relevant allocated memory region can be stored.

Exemplary embodiment 3 is the method according to exemplary embodiment 1 or 2, comprising enabling the memory region and removing the one or more watchpoints depending on a runtime (e.g., when overwriting a predetermined threshold in the form of an absolute time (e.g., milliseconds) or a number of clock cycles) of the computer program (e.g., since the memory enable command was reached).

This prevents the memory region from being permanently blocked (i.e., it can no longer be reallocated), which could lead to problems with longer programs or those that have a greater memory requirement.

Exemplary embodiment 4 is the method according to one of exemplary embodiments 1 to 3, comprising executing the computer program on an embedded system and setting the watchpoints by means of a test system connected to the embedded system.

According to various embodiments, testing a computer program for an embedded system on the embedded system itself is made possible, including memory monitoring.

Exemplary embodiment 5 is the method according to one of exemplary embodiments 1 to 4, wherein the computer program is a control program for a robot device, and the robot device is controlled depending on a result of testing the computer program with the computer program.

Exemplary embodiment 6 is a test arrangement which is configured to carry out a method according to one of exemplary embodiments 1 to 5.

Exemplary embodiment 7 is a computer program comprising instructions that, when executed by a processor, cause the processor to carry out a method according to one of exemplary embodiments 1 to 5.

Exemplary embodiment 8 is a computer-readable medium storing instructions that, when executed by a processor, cause the processor to carry out a method according to one of exemplary embodiments 1 to 5.

In the figures, similar reference signs generally refer to the same parts throughout the various views. The figures are not necessarily true to scale, with emphasis instead generally being placed on the representation of the principles of the present invention. In the following description, various aspects are described with reference to the figures.

DETAILED DESCRIPTION OF EXAMPLE EMBODIMENTS

The following detailed description relates to the figures, which show, by way of explanation, specific details and aspects of this disclosure in which the present invention can be executed. Other aspects may be used and structural, logical, and electrical changes may be performed without departing from the scope of protection of the present invention. The various aspects of this disclosure are not necessarily mutually exclusive, since some aspects of this disclosure may be combined with one or more other aspects of this disclosure to form new aspects.

Various examples are described in more detail below.

Figure 1:
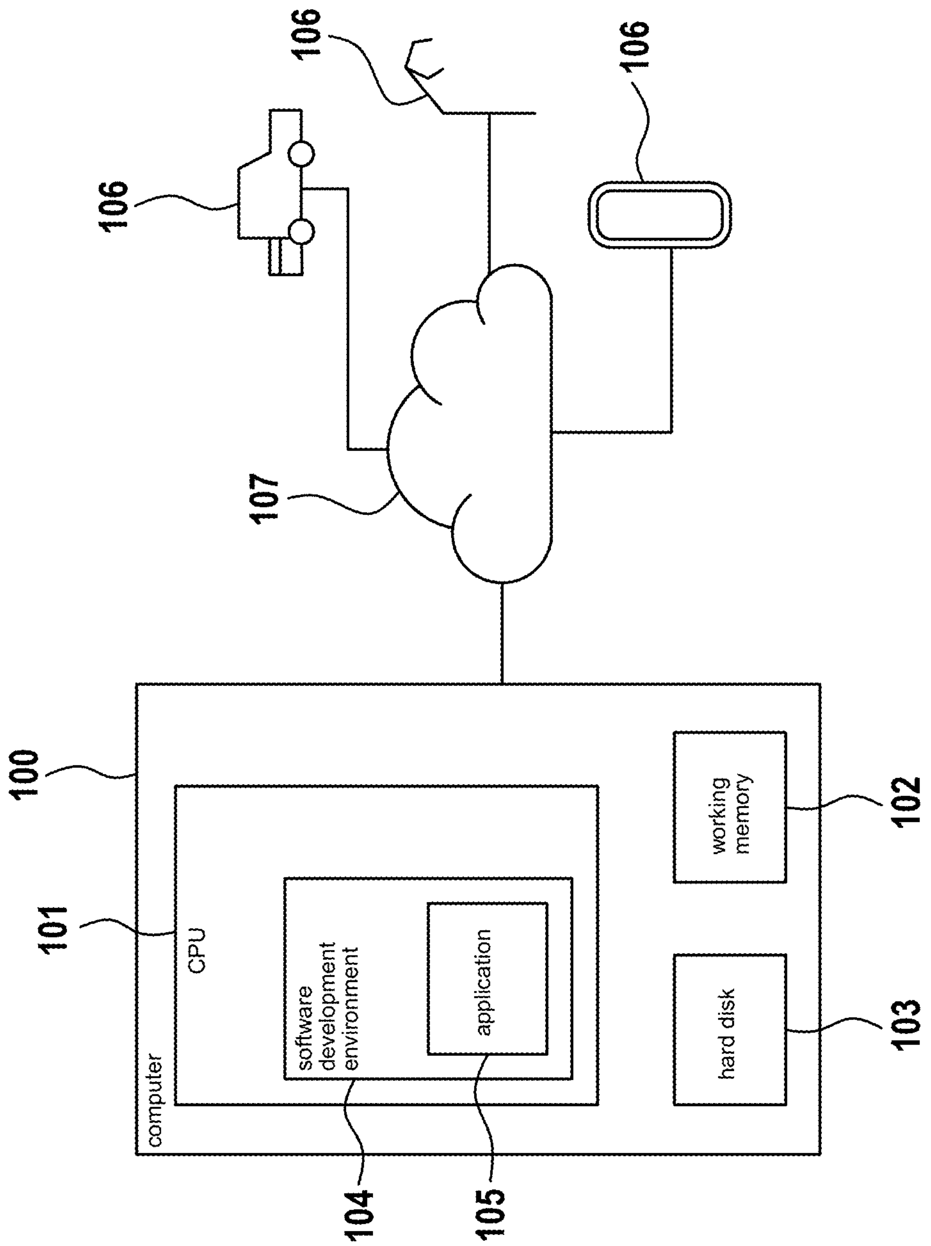
FIG. 1 shows a computer for the development and/or testing of software applications, according to an example embodiment of the present invention.

FIG. 1 shows a computer 100 for the development and/or testing of software applications.

The computer 100 comprises a CPU (central processing unit) 101 and a working memory (RAM) 102. The working memory 102 is used for loading program code, e.g., from a hard disk 103, and the CPU 101 executes the program code.

In the present example, it is assumed that a user intends to develop and/or test a software application with the computer 100.

For this purpose, the user runs a software development environment 104 in the CPU 101.

The software development environment 104 makes it possible for the user to develop and test an application 105 for different devices 106, i.e., target hardware, such as embedded systems for controlling robot devices, including robot arms and autonomous vehicles, or also for mobile (communication) devices. For this purpose, the CPU 101 can run an emulator as part of the software development environment 104 in order to simulate the behavior of the particular device 106 for which an application is being or has been developed. If it is used only for testing software from another source, the software development environment 104 can also be regarded as or configured as a software testing environment.

The user can distribute the finished application to corresponding devices 106 via a communication network 107. Rather than via a communication network 107, this can also be done in another way, for example by means of a USB stick.

However, before this happens, the user should test the application 105 in order to prevent an improperly functioning application from being distributed to the devices 106.

One test method is so-called fuzzing. Fuzzing or fuzz-testing is an automated software test method in which invalid, unexpected or random data are supplied as inputs to a computer program to be tested. The program is then be monitored for exceptions such as crashes, missing failed code assertions or potential memory leaks.

Typically, fuzzers (i.e., test programs that use fuzzing) are used to test programs that process structured inputs. This structure is for example specified in a file format or in a file format or protocol and distinguishes between valid and invalid inputs. An effective fuzzer generates semi-valid inputs that are "valid enough" not to be rejected immediately by the input parser of the program to be tested, but "invalid enough" to cover unexpected behaviors and borderline cases that are not being handled properly in the program to be tested.

The terminology used in connection with fuzzing is described below:

- Fuzzing or fuzz-testing is the automated testing process of sending randomly generated inputs to a target program (program to be tested) and observing its reaction.
- A fuzzer or a fuzzing engine is a program that automatically generates inputs. It is therefore not linked to the software to be tested, and neither is any instrumentation performed. However, it has the ability to instrument code, generate test cases, and run programs to be tested. Conventional examples are AFL and libFuzzer.
- A fuzz target is a software program or a function that is to be tested by fuzzing. A main feature of a fuzz target should be that it accepts potentially untrusted inputs that are generated by the fuzzer during the fuzzing process.
- A fuzz test is the combined version of a fuzzer and a fuzz target. A fuzz target can then be instrumented code in which a fuzzer is linked to its inputs (i.e., delivers them). A fuzz test can be executed. A fuzzer can also start, observe, and stop a plurality of fuzz tests (normally hundreds or thousands per second), each with a somewhat different input generated by the fuzzer.
- A test case is a specific input and a specific test run from a fuzz test. Normally, runs of interest with regard to reproducibility are saved (finding new code paths or crashes). In this way, a specific test case with the corresponding input can also be run on a fuzz target which is not connected to a fuzzer, e.g., the release version of a program.
- Coverage-guided fuzzing uses code coverage information as feedback during fuzzing in order to detect whether an input has caused the execution of new code paths or blocks.
- Generation-based fuzzing uses prior knowledge about the target program (fuzz target) in order to create test inputs. An example of such prior knowledge is a grammar which corresponds to the input specification of the fuzz target, i.e., the input grammar of the fuzz target (i.e., of the program to be tested).
- Static instrumentation is the insertion of instructions into a program (to be tested) in order to obtain feedback about its execution. It is usually realized by the compiler and can indicate, for example, the code blocks reached during execution.
- Dynamic instrumentation is the control of the execution of a program (to be tested) during runtime in order to generate feedback from the execution. It is usually realized by operating system functionalities or by the use of emulators.
- A debugger is a device or a program that can control a target device or target program and can provide functions, e.g., for retrieving register or memory values and for pausing and executing the target program in single steps.

A breakpoint is set via a debugger on an instruction of the target program or device in order to stop execution when it is reached and to inform the controlling process about this.

Via a debugger a (data) watchpoint is set to a memory address of a target program or target device in order to stop execution when the memory address is accessed, and to inform the controlling process by triggering an interrupt.

Embedded systems usually have a microcontroller that processes inputs and responds with outputs in order to fulfill a specific task. Although microcontrollers use the same memory model and are programmed with the same programming languages as normal user programs, their programs are significantly more difficult to test. In order to make debugging possible, microcontrollers usually offer the possibility of interrupting the program with breakpoints (stopping points), of running through the instructions of the program in single steps and of setting watchpoints on memory addresses. Watchpoints trigger an interrupt when the corresponding memory regions are accessed. Hardware breakpoints and watchpoints are typically implemented as physical registers in the debugging unit of a microcontroller, and their number is therefore limited and depends on the system in question. For example, the maximum number for a typical microcontroller is four breakpoints and two data watchpoints. Normally, watchpoints can distinguish between read and write accesses.

Breakpoints and watchpoints can be used in particular for realizing a debugger-controlled fuzzing, so that no instrumentation is required.

Fuzzing, also debugger-controlled fuzzing, is very efficient at finding bugs that trigger an observable behavior, such as a crash or reboot. However, entire classes of bugs cannot be observed, since with these the program silently fails. One example is the heartbleed bug. The core of the heartbleed bug was that it only reads beyond the boundary of an array whereas a write operation would have caused an easily observable segmentation error.

The heartbleed bug was only found with the aid of the address sanitizer (ASan). During the compilation of a program ASan inserts additional instructions, metadata and checks in order to prevent memory corruption bugs. If such sanitizer instructions are available in a program, more bugs can be found during debugging of the program than without a sanitizer. In particular, automated tests, such as fuzzing, shine when a sanitizer is provided in the program to be tested (i.e., in the fuzz target) in order to cover additional bugs.

For embedded systems, such as a data processing device with ARM architecture, such sanitizers are not so easy to use as for standard platforms, such as x86 platforms. There are several reasons for this:

An embedded system is too resource-limited to implement a sanitizer. For example, Asan needs double the memory, MSan (MemorySanitizer) needs 2.5 times the resources, and UBSan (UndefinedBehaviorSanitizer) even needs three times the working memory of the program.

Sanitizers increase the size of the compiled binary file. In the automotive industry, as a rule the size of such binary files almost corresponds to the available flash memory of the target hardware. An additional instrumentation of a sanitizer would not therefore fit into the flash memory.

Due to the additional instrumentation of sanitizers and the collection and tracking of metadata, the use of a sanitizer results in a slower runtime of a binary program on the hardware in question. Embedded systems are strongly dependent on asynchronous events, such as interrupts, and therefore sanitizers can lead to time-based false-positive errors, i.e., a sanitizer can introduce new errors during runtime.

As a rule, embedded systems do not have a user interface for displaying runtime errors. On x86 systems, a segmentation error for example is forwarded to STDERR, so that the user sees the crash. In contrast, embedded systems fail silently, i.e., without the user noticing and restart after such a crash.

According to various embodiments, an approach is therefore provided which makes possible the use of memory monitoring (i.e., a sanitizer functionality) for an embedded system, in particular such that the memory monitoring can be used for a debugger-controlled fuzzing. In this case, the memory monitoring itself is made possible with the aid of a debugger (or the debugger used for the fuzzing).

In debugger-based fuzzing, interactions between the system carrying out the test (and which corresponds, for example, to the computer 100) and the target system (target hardware, e.g., an embedded system, for example a target device 106) take place via a debugging connection (i.e., debugging interface), which is provided by a dedicated debugger hardware device, for example. The test input data are transmitted to the target system 106 in the form of an input vector, for example via WiFi or a CAN bus (depending on the type of target device 106), i.e., in this testing the communication network 107 is such a debugging connection (when distributing the tested software, the communication network can then be any other communication network). The system which carries out the test, also referred to below as test system 100, controls the execution of the target program (i.e., of the program to be tested) in the target system via the debugging connection, i.e., starts execution and resumes execution after an interrupt (in particular an interrupt that has been triggered by a data watchpoint).

A debugger-controlled sanitizer does not require instrumentation or emulation, but only a debugging interface to the target system (e.g., an embedded system in which the software is run) with the possibility of setting breakpoints and watchpoints. This type of debugging interface and capabilities are generically and widely available, which leads to a broad and simple applicability of the approach described below. In addition, the memory of the target system is only slightly loaded, e.g., for metadata, since most or all of the sanitizer-related information is collected and stored on the host side of the debugger (i.e., in the system 100 to be tested), so that the embedded system can also be tested in its finished version (e.g., as it is sold). The size of the compiled binary file of the target program is not increased, since it can be used during testing in the same way as it is intended for the target system 106.

A debugger stops the target system when a breakpoint is reached. For this reason, the approach described below leads to time-based false alarms only in rare cases. These false alarms can also be excluded by other test techniques, e.g., by subsequent validation of a bug found in the target system. The use of a debugger also provides a good insight into the internals of a target system.

The approach described below is used to detect access to memory regions that have already been enabled (e.g., dynamic buffer regions in the memory).

It should be noted that identity-based check tools can invalidate the identity of enabled objects. An access checking mechanism can then recognize outdated (i.e., dangling) pointer references as long as the enabled memory or identity is not reused. However, if the relevant program reuses the memory or identity for new assignments, this approach incorrectly allows outdated pointer references. Reuse delay-based tools reduce the likelihood of such recognition errors in that they delay the reuse of memory regions or identities until they are "aged". This leads to a trade-off between precision and memory overhead since longer reuse delays lead to a higher memory overhead, but also to a higher probability of recognizing outdated pointer references.

According to various embodiments, such an aging mechanism is used in connection with (and e.g., adapted to) a debugger.

For example, the test system 100 performs the following:

1. Setting breakpoints to memory allocation commands such as malloc, realloc and calloc
2. When one of the memory allocation commands is called, an interrupt is triggered by the relevant set breakpoint. In response thereto, the test system 100 saves the base address (i.e., start address of the relevant memory region to be allocated) and the size of the memory region to be allocated as allocation metadata.
3. Setting breakpoints to memory enable commands such as free
4. In response to the triggering of an interrupt by one of the breakpoints set to a memory enable command
   a. Saving the pointer of the memory enable command (i.e., the beginning of the memory region that is to be enabled by the memory enable function) as enable metadata
   b. Setting one or more watchpoints to memory locations of the memory region that the memory enable function is to enable (ideally to all memory locations of the memory region that the memory enable function is to enable, if enough watchpoints are available); the size of the memory region can be ascertained, for example, using the allocation metadata, which in turn can be assigned to the memory enable command using the memory address (i.e., the enable metadata).
   c. Continuing the program (i.e., return from the interrupt routine of the triggered interrupt) without enabling the memory region that the memory enable function is to enable (i.e., effectively skipping the enable command)
5. If one of the watchpoints is triggered, this is evaluated as an error (access to enabled memory). In this case, the test system 100 therefore indicates that an error has occurred, which in turn can trigger the execution of a safety measure.
6. If a memory region to be enabled by a skipped enable command is aged (which can be configured, e.g., as a certain runtime specified as execution time (e.g., in milliseconds) or as a certain number of clock signals of the executing device, i.e., e.g., the relevant target system 106), the watchpoint(s) that are set to the memory region is/are removed, and the memory enable command that enables this memory region (and which was skipped) is executed.

Since the number of breakpoints and watchpoints can be limited, it is possible that not all enabled (or to be enabled) memory regions can be fully monitored in this way. If this is the case, the test system (e.g., a fuzzer that is used to test the computer program 105) can randomly select the subset of memory regions and also their parts (i.e., the memory locations) thereof that are to be monitored, or the memory regions are monitored in succession in multiple runs of the target program (e.g., fuzz test runs).

A memory location is understood here as a unit of memory that is monitored by a watchpoint, e.g., the memory region assigned to a memory address (which can be selected as the target of a watchpoint).

Figure 2:
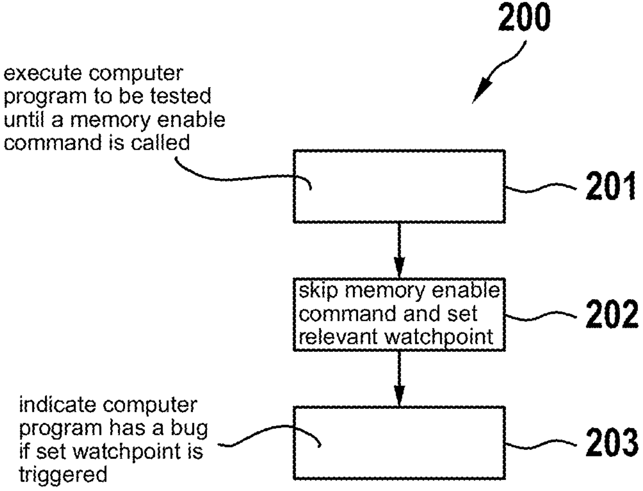
FIG. 2 shows a flowchart which represents a method for testing a computer program according to one example embodiment of the present invention.

In summary, according to various embodiments, a method is provided as shown in FIG. 2.

FIG. 2 shows a flowchart 200 illustrating a method for testing a computer program according to one embodiment.

In 201, the computer program (to be tested) is executed until a memory enable command is called for a memory region previously allocated by a memory allocation command of the computer program.

In 202, the memory enable command is skipped and, for each of one or more memory locations of the memory region that is to be enabled by the memory enable command, a relevant watchpoint is set to the memory location of the memory region.

In 203, for each set watchpoint, it is indicated that the computer program has a bug if (i.e., in response to) the set watchpoint is triggered.

The method in FIG. 2 can be carried out by one or more computers with one or more data processing units. The term "data processing unit" may be understood as any type of entity that enables processing of data or signals. The data or signals can be treated, for example, according to at least one (i.e., one or more than one) special function which is performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA) or any combination thereof. Any other way of implementing the respective functions described in more detail herein may also be understood as a data processing unit or logic circuit assembly. One or more of the method steps described in detail here can be executed (e.g., implemented) by a data processing unit by one or more special functions that are performed by the data processing unit.

The approach of FIG. 2 is used for testing a program, for example control software for a robot device. The term "robot device" may be understood to refer to any technical system, such as a computer-controlled machine, a vehicle, a household appliance, a power tool, a production machine, a personal assistant or an access control system. The control software can also be used for data-processing systems, such as a navigation device.

The method of FIG. 2 is carried out, for example, by a test arrangement (e.g., the computer 100 and target device 106 in FIG. 1).

Although specific embodiments have been depicted and described herein, a person skilled in the art will recognize that the specific embodiments shown and described may be replaced with a variety of alternative and/or equivalent implementations without departing from the scope of protection of the present invention. This application is intended to cover any adaptations or variations of the specific embodiments discussed herein.

What is claimed is:

1. A method for testing a computer program, comprising the following steps:

executing the computer program until a memory enable command of the computer program is called for a memory region previously allocated by a memory allocation command of the computer program;

skipping the memory enable command of the computer program, and setting, for each memory location of one or more memory locations of the memory region that is to be enabled by the memory enable command of the computer program, a relevant watchpoint to the memory location of the one or more memory locations of the memory region; and displaying, for each set relevant watchpoint to the memory location of the one or more memory locations of the memory region, that the computer program has a bug when the set relevant watchpoint to the memory location of the one or more memory locations of the memory region is triggered, wherein the computer program is executed until the memory allocation command of the computer program is called, information about which memory region is allocated by the memory allocation command of the computer program is stored, and the one or more memory locations of the memory region to which one or more watchpoints are set are ascertained based on the stored information.

2. The method according to claim 1, further comprising: enabling the memory region and removing the one or more watchpoints in the one or more memory locations of the memory region depending on a runtime.

3. The method according to claim 1, further comprising: executing the computer program on an embedded system and setting the one or more watchpoints using a test system connected to the embedded system.

4. The method according to claim 1, wherein the computer program is a control program for a robot device, and wherein the robot device is controlled with the computer program depending on a result of testing the computer program.

5. A test arrangement configured to test a computer program, the test arrangement comprising:

a processor; and a non-transitory computer-readable medium on which are stored instructions for testing the computer program, the instructions, when executed by the processor, causing the processor to perform the following steps including:

executing the computer program until a memory enable command of the computer program is called for a memory region previously allocated by a memory allocation command of the computer program;

skipping the memory enable command of the computer program, and setting, for each memory location of one or more memory locations of the memory region that is to be enabled by the memory enable command of the computer program, a relevant watchpoint to the memory location of the one or more memory locations of the memory region; and displaying, for each set relevant watchpoint to the memory location of the one or more memory locations of the memory region, that the computer program has a bug when the set relevant watchpoint to the memory location of the one or more memory locations of the memory region is triggered, wherein the computer program is executed until the memory allocation command of the computer program is called, information about which memory region is allocated by the memory allocation command of the computer program is stored, and the one or more memory locations of the memory region to which one or more watchpoints are set are ascertained based on the stored information.

6. A non-transitory computer-readable medium on which is stored a computer program including instructions for testing a computer program, the instructions, when executed by a processor, causing the processor to perform the following steps:

executing the computer program until a memory enable command of the computer program is called for a memory region previously allocated by a memory allocation command of the computer program;

skipping the memory enable command of the computer program, and setting, for each memory location of one or more memory locations of the memory region that is to be enabled by the memory enable command of the computer program, a relevant watchpoint to the memory location of the one or more memory locations of the memory region; and displaying, for each set relevant watchpoint to the memory location of the one or more memory locations of the memory region, that the computer program has a bug when the set relevant watchpoint to the memory location of the one or more memory locations of the memory region is triggered, wherein the computer program is executed until the memory allocation command of the computer program is called, information about which memory region is allocated by the memory allocation command of the computer program is stored, and the one or more memory locations of the memory region to which one or more watchpoints are set are ascertained based on the stored information.

* * * * *